Patented Apr. 9, 1946

2,398,042

UNITED STATES PATENT OFFICE 2,398,042

METHOD OF APPLYING PROTECTIVE COATINGS

Martin Salo, Rochester, N. Y., assignor to Eastman Kodak Company, Rochester, N. Y., a corporation of New Jersey No Drawing. Application July 3, 1942, Serial No. 449,675

15 Claims. (Cl. 117—157)

This invention relates to a method of forming protective coatings upon surfaces by applying thereto a molten composition of a cellulose ether and a plasticizer therefor.

Heretofore ethyl cellulose has been employed in melt coating compositions, but only in small quantities, in compositions in which wax or moistureproofing material predominated, the ethyl cellulose apparently being employed merely to impart better film-forming properties to the compositions.

These coatings have been characterized by considerable softness at ordinary temperature and they melt at comparatively low temperatures. Therefore, the field for usefulness of those coatings is quite limited and their durability leaves much to be desired.

The prior art has taught that when ethyl cellulose was employed in an amount greater than 20% of a composition, the mass was not properly flowable and the moisture transmission of the composition was too great. In no case has there been any indication in the prior art that any of the cellulose ethers, particularly ethyl cellulose, have been suitable merely mixed with plasticizer for satisfactorily melt coating materials upon which a protective covering is desirable.

An object of my invention is to provide a process of applying protective coatings to surfaces, which coatings protect the surface against the wear and weathering which might be met with in the use of various materials such as paper, fabric, and the like. Other objects of my invention will appear herein.

I have found that ethyl celluloses having certain restricted properties when mixed with an amount of plasticizer forming at least 20% of the composition can be applied as a melt to a surface and will give a flexible, glossy, smooth, and transparent coating which will withstand impact creasing without breaking. I have found that molten compositions, in accordance with my invention, can be applied to paper, glass, cloth, metal, leather, wire, or any other susceptible material, particularly having a smooth surface, thereby forming a protective covering thereon. I have found that melt coatings, in which at least 50% of the composition is an ethyl cellulose as described herein, are firm and durable and resistant to the effects of moderate heat and light. The melted cellulose ether compositions described may be applied in any desired manner which will give a smooth, thin, uniform coating on the cloth, paper, or other material to be coated. For instance the molten material may be flowed from the hopper through a restricted opening onto a cloth, paper, or the like as the latter is moved along under the hopper. To obtain a uniform coating a blade, adjusted as desired, may be in the line of movement almost immediately after the hopper to spread the coating while it is still in a soft condition. Instead of a blade some other spreading means, as an air brush, may be used. As the coating cools and solidifies rapidly the coated cloth, paper, or the like may be wound up in a roll shortly after the application on the coating.

If desired the molten mixture of the cellulose ether and plasticizer may be applied to the cloth, paper, etc., by spraying it thereon. In this way the application of the melt to the surface may be manually controlled and is particularly useful where a surface of uneven thickness is desired.

The molten coating material may be applied by means of an applicator roll, either one which dips in the melted material and is heated to maintain the coating material in a melted condition until it contacts the cloth, paper, etc., which is to be coated, or one which is heated and to which a thin film of the molten material is imparted by means of an adjustable doctor or some other manner. The applicator roll or rolls are preferably maintained at approximately the same temperature as the molten material. After the application of the molten coating material, but before it has had time to harden, it is preferred that the coated material be subjected to further treatment such as by heated smoothing rolls or squeeze rolls, a blade or an air brush if a smooth surface is desired, or heated embossing rolls if some sort of embossing or design is wanted.

The composition which I employ essentially consists of 50–80% ethyl cellulose of the type described below, mixed with at least 20% of a stable compatible plasticizer. The composition may contain small amounts of wax, resin, filler or pigment, but should be substantially free of flowable material. It is desirable that this group of extra materials make up less than 10% of the composition taken in their entirety.

The ethyl cellulose which is employed in my composition should be one having an ethoxy content between 45% and 55% and should be of low viscosity, the viscosity being between 5 and 100 cnol (2:1). The ethyl cellulose should be stable, as evidenced by its ability to withstand a temperature of 180° C. for eight hours without blackening or charring. The obtaining of ethyl celluloses of this type is described and claimed in Malm and Crane application Serial No. 410,432, filed September 11, 1941. Stable ethyl celluloses will also have a high char point, ordinarily at least 300° C.

The plasticizer employed in the composition used for melt coating, in accordance with my invention, should make up at least 20% and preferably 30% of the composition. The plasticizer employed should be a stable, compatible, high molecular weight plasticizing compound. Some of the plasticizers which have been found to be suitable for this purpose are di-2-ethyl hexyl phthalate, n-butyl stearate, dibutyl sebacate, dibutyl phthalate, diamyl phthalate, and glycol sebacate.

The temperature at which the coating composition is maintained is preferably close to the melting point of the cellulose ether. As the presence of plasticizer lowers the melting point, this temperature will ordinarily just keep the composition in a melted condition. A temperature in the range of 280–340° F. will ordinarily be found the most useful for ethyl cellulose compositions in accordance with my invention. According to my invention coatings having a thickness of approximately .0005 inch are ordinarily applied to surfaces. If desired, however, thicker coatings such as up to .001 inch or even more thickness may be applied merely by speeding up the flow of the molten composition onto the surface and by adjusting the spacing of the doctor blade or other smoothing means to allow for greater thickness. If desired, however, coatings having much less thickness than that ordinarily employed may be used. For instance, in the coating of paper, if the paper is put through squeeze rolls the thickness of the resulting product may be substantially the same as the thickness of the paper before subjecting to the coating operation.

My coating methods may be employed to coat paper, giving thereon a transparent, flexible coating which will protect the paper and yet will not interfere with many and various uses. By this means a desirable wrapping material may be prepared. Also, an artificial leather may be prepared by my process by coating paper and, if desired, embossing it. For instance paper, after applying a coating thereto in accordance with my invention, may be run through an embossing roll having a pressure of 260 tons at 230° F. A highly flexible artificial leather is thereby obtained. If desired a small amount of antioxidant such as hydroquinone might be included in the composition, particularly if the composition is to be maintained in molten condition for a considerable period of time. If desired a compatible and stable dye material may be incorporated in the composition if a colored coating is desired. The coating which I apply, preferably to flat or plane surfaces, is of good permanence and under ordinary conditions will last as long as the article on which the coated material is used. Although coating onto flat surfaces is preferable, my coating method is adaptable to the coating of any type of surface, whether rough or smooth, although the coating of smooth surfaces is more convenient and gives more uniform thickness of the protective covering. It is, of course, desirable that coating compositions, in accordance with my invention, be free of any material which will discolor the decomposition in use.

A satisfactory method of preparing the coating composition employed in my process is to select an ethyl cellulose such as prepared by the process described in Malm and Crane application 410,432, which ethyl cellulose has the properties described, and by ball-milling the ethyl cellulose and then mixing it with the desired proportion of plasticizer and any other desired ingredients, all preferably in finely divided form. The mixture so obtained is suitable for forming the molten composition for use in the protective covering of objects in accordance with my invention. The following examples illustrate my invention:

Example I

A composition was prepared by mixing together in finely divided form 28 parts of di-2-ethyl hexyl phthalate and 72 parts of ethyl cellulose having an ethoxyl content of 49%, a viscosity of 35 cps. in 10% solution in toluene-ethanol (2:1) at 25° C., melting point of 151° C. and a char point of 310° C. This composition was then melted by heating to 350° F. and was coated onto paper by means of a melt coating machine. In this machine a measured thickness of melt was applied onto the paper from a heated applicator roll rotating in the direction of the paper. The melt was applied onto the applicator roll by a pick-up roll partially submerged in the melt contained by the heated hopper and rotated in a direction opposite to that of the applicator roll. The clearance between the pick-up and applicator rolls was adjusted to give the desired quantity of melt on the applicator roll. After the melt was applied onto the paper the coating was smoothed by a heated smoothing bar. The coating hardened and became non-tacky very shortly after leaving the doctor blade. The coating was flexible and glossy in appearance.

Example II

Paper was melt coated as in Example I with a composition consisting of 33 parts of di-2-ethyl hexyl phthalate and 67 parts of ethyl cellulose having an ethoxyl content of 49%, viscosity of 53 cps. in 10% solution in 2:1 toluene-ethanol at 25° C., a melting point of 153° C., and a char point of 310° C. A brilliant and flexible coating was obtained.

Example III

A composition consisting of 30 parts of n-butyl stearate and 70 parts of the same kind of ethyl cellulose as used in the preceding example was melt coated onto paper in the same manner. A flexible coating of good brilliance was obtained.

Example IV

Paper was coated at 290° F. on a melt coating machine as described in Example I, with a molten composition consisting of 25 parts of dibutyl sebacate and 75 parts of ethyl cellulose having an ethoxyl content of 47% and viscosity of 5.7 cps. in a 10% solution in 2:1 toluene-ethanol, a melting point of 154° C. and a char point of 311° C. A brilliant coating was obtained, but the flexibility was not as good as was obtained in the previous examples, probably due to the lower viscosity of the ethyl cellulose used.

Example V

A composition consisting of 65 parts of ethyl cellulose having an ethoxyl content of 49%, a viscosity of 90 cps., a melting point of 169° C. and a char point of 304° C. in 35 parts of 2-ethyl hexyl phthalate was melt coated onto paper at 340° F. in the manner described in the preceding examples. A paper having a smooth, glossy, transparent, and flexible coating was obtained.

What I claim and desire to be secured by Letters Patent of the United States is:

1. A paper sheet having a firm protective coating thereon which is strongly adherent at atmospheric temperatures resulting from depositing thereon in molten fully-fluid condition a thin layer of a low melting composition, essentially consisting of 50-80% of a heat-stable ethyl cellulose which has an ethoxy content of 45-55% and a viscosity of 5-100 centipoises and at least 20% of a stable, compatible, high molecular weight plasticizer.

2. A method of forming a protective coating upon a cellulose web which comprises depositing thereon in a molten fully-fluid condition a low-melting composition essentially consisting of 50-80% of a heat stable ethyl cellulose having an ethoxyl content of 45-55% and a viscosity of 5-100 centipoises, and at least 20% of a stable compatible high molecular weight plasticizer so as to form a thin layer of the composition upon the web.

3. A method of forming a protective coating upon a paper sheet which comprises depositing thereon in a molten fully-fluid condition a low-melting composition essentially consisting of 50-80% of a heat stable ethyl cellulose having an ethoxyl content of 45-55% and a viscosity of 5-100 centipoises, and at least 20% of a stable compatible high molecular weight plasticizer so as to form a thin layer of the composition upon the paper.

4. A method of forming a protective coating upon a paper sheet which comprises flowing onto that paper sheet in a molten fully-fluid condition a low-melting composition essentially consisting of 50-80% of a heat stable ethyl cellulose having an ethoxyl content of 45-55% and a viscosity of 5-100 centipoises, and at least 20% of a stable compatible high molecular weight plasticizer so as to form a thin layer of the composition upon the paper.

5. A method of forming a protective coating upon a paper sheet which comprises depositing thereon in a molten fully-fluid condition a low-melting composition essentially consisting of 50-80% of a heat stable ethyl cellulose having an ethoxyl content of 45-55% and a viscosity of 5-100 centipoises, and at least 20% of di-2-ethyl-hexyl-phthalate so as to form a thin layer of the composition on the paper.

6. A method of forming a protective coating upon a surface which comprises flowing onto that surface in a molten fully-fluid condition a low-melting composition essentially consisting of 75% of a heat stable ethyl cellulose having an ethoxyl content of approximately 47% and a viscosity of approximately 5.7 centipoises and 25% of dibutyl sebacate so as to form a thin layer of the composition upon the surface.

7. A method of forming a protective coating upon a surface which comprises depositing on that surface in a molten fully-fluid condition a low-melting composition essentially consisting of 50-80% of a heat stable ethyl cellulose having an ethoxyl content of 45-55% and a viscosity of 5-100 centipoises and at least 20% of a stable, compatible, high molecular weight plasticizer so as to form a thin layer of the composition upon the surface.

8. A method of forming a protective coating upon a surface which comprises flowing onto that surface in a molten fully-fluid condition a low-melting composition essentially consisting of 50-80% of a heat stable ethyl cellulose having an ethoxyl content of 45-55% and a viscosity of 5-100 centipoises and at least 20% of a stable, compatible, high molecular weight plasticizer so as to form a thin layer of composition upon the surface.

9. A method of forming a protective coating upon a surface which comprises depositing on that surface in a molten fully-fluid condition a low-melting composition essentially consisting of 50-80% of a heat stable ethyl cellulose having an ethoxyl content of 45-55% and a viscosity of 5-100 centipoises and at least 20% of di-2-ethyl hexyl phthalate so as to form a thin layer of the composition upon the surface.

10. A method of forming a protective coating upon a surface which comprises depositing on that surface in a molten fully-fluid condition a low-melting composition essentially consisting of 50-80% of a heat stable ethyl cellulose having an ethoxyl content of 45-55% and a viscosity of 5-100 centipoises and at least 20% of dibutyl sebacate so as to form a thin layer of the composition upon the surface.

11. A cellulose web having a firm protective coating thereon which is strongly adherent at atmospheric temperatures resulting from depositing thereon in a molten fully-fluid condition a thin layer of a low-melting composition essentially consisting of 50-80% of a heat stable ethyl cellulose having an ethoxyl content of 45-55% and a viscosity of 5-100 centipoises and at least 20% of a stable, compatible, high molecular weight plasticizer.

12. A cellulose web having a firm protective coating thereon which is strongly adherent at atmospheric temperatures resulting from depositing thereon in molten fully-fluid condition a thin layer of a low-melting composition essentially consisting of 50-80% of a heat stable ethyl cellulose having an ethoxyl content of 45-55% and a viscosity of 5-100 centipoises and at least 20% of di-2-ethyl hexyl phthalate.

13. A cellulose web having a firm protective coating thereon which is strongly adherent at atmospheric temperatures resulting from depositing thereon in molten fully-fluid condition a thin layer of a low-melting composition essentially consisting of 50-80% of a heat stable ethyl cellulose having an ethoxyl content of 45-55% and a viscosity of 5-100 centipoises and at least 20% of dibutyl sebacate.

14. A paper sheet having a firm protective coating thereon which is strongly adherent at atmospheric temperatures resulting from depositing thereon in molten fully-fluid condition a thin layer of a low-melting composition essentially consisting of 50-80% of a heat stable ethyl cellulose which has an ethoxyl content of 45-55% and a viscosity of 5-100 centipoises and at least 20% of di-2-ethyl hexyl phthalate.

15. A paper sheet having a firm protective coating thereon which is strongly adherent at atmospheric temperatures resulting from depositing thereon in molten fully-fluid condition a thin layer of a low-melting composition essentially consisting of 50-80% of a heat stable ethyl cellulose which has an ethoxyl content of 45-55% and a viscosity of 5-100 centipoises and at least 20% of dibutyl sebacate.

MARTIN SALO.

Certificate of Correction

Patent No. 2,398,042. April 9, 1946.

MARTIN SALO

It is hereby certified that error appears in the printed specification of the above numbered patent requiring correction as follows: Page 1, second column, line 49, after the numeral "100" insert *cps. measured in a 10% solution of toluene-eth-*; and that the said Letters Patent should be read with this correction therein that the same may conform to the record of the case in the Patent Office.

Signed and sealed this 2d day of July, A. D. 1946.

[SEAL]

LESLIE FRAZER,
*First Assistant Commissioner of Patents.*